(12) United States Patent
Areddu et al.

(10) Patent No.: US 7,552,201 B2
(45) Date of Patent: Jun. 23, 2009

(54) METHOD AND SYSTEM FOR CONFIGURATION CONTROL IN TELECOMMUNICATIONS NETWORKS

(75) Inventors: Marco Areddu, Turin (IT); Riccardo Arizio, Turin (IT); Claudio Claretto, Turin (IT); Luigi De Martino, Turin (IT); Gabriele Gentile, Turin (IT)

(73) Assignee: Telecom Italia S.p.A., Milan (IT)

( * ) Notice: Subject to any disclaimer, the term of this patent is extended or adjusted under 35 U.S.C. 154(b) by 531 days.

(21) Appl. No.: 10/524,641

(22) PCT Filed: Aug. 6, 2003

(86) PCT No.: PCT/EP03/08702

§ 371 (c)(1),
(2), (4) Date: Feb. 11, 2005

(87) PCT Pub. No.: WO2004/019556

PCT Pub. Date: Mar. 4, 2004

(65) Prior Publication Data

US 2006/0117027 A1    Jun. 1, 2006

(30) Foreign Application Priority Data

Aug. 23, 2002   (IT)   ............................ TO2002A0742

(51) Int. Cl.
    *G06F 15/16* (2006.01)
(52) U.S. Cl. .................. 709/220; 703/13; 707/100; 370/241
(58) Field of Classification Search .......... 709/200–202, 709/220–224; 707/100; 703/13–14, 21, 703/23, 27; 370/241
    See application file for complete search history.

(56) References Cited

U.S. PATENT DOCUMENTS

| 5,872,928 | A   | 2/1999  | Lewis et al. |
| 6,349,306 | B1  | 2/2002  | Malik et al. |
| 6,922,395 | B1* | 7/2005  | Elliott et al. ................ 370/241 |
| 6,978,301 | B2* | 12/2005 | Tindal ........................ 709/223 |

(Continued)

FOREIGN PATENT DOCUMENTS

EP        1 005 216        5/2000

OTHER PUBLICATIONS

Use Case Maps and Lotos for Prototyping and Validation . . . by D. Amyot et al. (Computer Comm.) 23 (2000).

*Primary Examiner*—Moustafa M Meky
(74) *Attorney, Agent, or Firm*—Banner & Witcoff, Ltd.

(57) ABSTRACT

The configuration of telecommunications-network elements is controlled by first generating a model configuration of the elements comprising, for at least one function of each element subjected to control, a respective model of implementation of the function itself. For each element subjected to control, at least one respective set of configuration data of the element itself is collected and, again for each element subjected to control and in the absence of interaction with the element itself, correspondence is verified between the one function as implemented on the basis of the at least one respective set of configuration data of the element and the model of implementation of the function itself included in the model configuration. These steps of generating, collecting and verifying are done relative to an interfacing element between two nodes of the plurality or a plurality of respective sets of configuration data of the element.

21 Claims, 10 Drawing Sheets

U.S. PATENT DOCUMENTS

| | | | | |
|---|---|---|---|---|
| 7,065,562 B2 * | 6/2006 | Courtney | .................... | 709/220 |
| 7,082,460 B2 * | 7/2006 | Hansen et al. | .............. | 709/220 |
| 7,200,548 B2 * | 4/2007 | Courtney | .................... | 703/27 |
| 2002/0032769 A1 * | 3/2002 | Barkai et al. | ................. | 709/224 |
| 2004/0172412 A1 * | 9/2004 | Files et al. | ............... | 707/104.1 |

* cited by examiner

| Par1_N | Par2_N | Par3_N | Par4_N | Par5_N | Par6_N | Par7_N | Par8_N | Par9_N |
|---|---|---|---|---|---|---|---|---|
| | 16 17 | | | | | | | |
| | 16 170 | | | | | | | |
| | 15 1703 | | | | | | | |
| | 16 17033 | | | | | | | |
| | 16 170335 | 8-14 | | | | | | |
| | 16 170336 | 8-14 | | | 23 | | | |
| | 15 170338 | 10-14 | | | 23 | | | |
| | 15 170339 | 10-14 | | | 23 | | | |
| | 15 3 | | | | | | | |
| | 15 33 | | | | | | | |
| | 16 333 | | | | 12 | | | |
| | 15 335 | | | | 12 | | | |
| | 15 3350 | | | | | | | |
| | 15 3351 | | 669 | | | | | |
| | 16 33511 | | | | | | | |
| | 16 335119 | 6 | | 8-13 | 12 | | | 3 |
| | 16 3352 | | | | | | | |

Fig. 4

| Par1_D | Par2_D | Par3_D | Par4_D | Par5_D | Par6_D | Par7_D | Par8_D | Par9_D |
|---|---|---|---|---|---|---|---|---|
| | 16 17 | | | | | | | |
| | 16 170 | | | | | | | |
| | 15 1703 | | | | | | | |
| | 16 17033 | | | | | | | |
| | 16 170335 | 8-14 | | | 23 | | | |
| | 16 170336 | 8-14 | | | 23 | | | |
| | 16 170338 | 10-14 | | | 23 | | | |
| | 16 170339 | 10-14 | | | 23 | | | |
| | 15 3 | | | | | | | |
| | 15 33 | | | | | | | |
| | 16 333 | | | | 12 | | | |
| | 16 335 | | | | 12 | | | |
| | 15 3350 | | | | | | | |
| | 15 3351 | | 669 | | | | | |
| | 16 33511 | | | | | | | |
| | 16 335110 | 6 | | 8-13 | 12 | | | 3 |
| | 16 3352 | | | | | | | |

Fig. 5

| PAR_I | Par2_N | Par2_D | Par3_N | Par3_D | Par4_N | Par4_D | Par5_N | Par5_D | Par6_N | Par6_D |
|---|---|---|---|---|---|---|---|---|---|---|
| 15 | 33568 | 33568 | | | | | | | 9 | 9 |
| 27 | 3 | | | | | | | | | |
| 27 | 33 | | | | | | | | | |
| 27 | 333 | | | | | | | | | |
| 27 | 335 | | | | | | | | 12 | |
| 27 | 3350 | | | | | | | | 12 | |
| 27 | 3351 | | | | | | | | | |
| 27 | 33119 | | | | | | | | 12 | |
| 27 | 3352 | | 9 | | | | | | 12 | |
| 27 | 3353 | | | | | | | | 12 | |
| 27 | 3354 | | | | | | | | 12 | |
| 27 | 3355 | | | | 568 | | | | | |
| 27 | 3356 | | | | | | 640 | | 12 | |
| 27 | 3357 | | | | | | | | | |
| 27 | 3358 | | | | | | | | 12 | |
| 27 | 33580 | | | | | | | | 12 | |
| 27 | 33581 | | | | | | | | 12 | |
| 27 | 33582 | | | | | | | | 12 | |
| 27 | 33583 | | | | | | | | 12 | |
| 27 | 33584 | | | | | | | | 12 | |
| 27 | 33585 | | | | | | | | 12 | |
| 27 | 33586 | | | | | | | | 12 | |
| 27 | 33587 | | | | | | | | 9 | |
| 27 | 3358 | | | | | | | | 9 | |
| 27 | 3359 | | | | | | | | 12 | |
| 27 | 338 | | | | | | | | 12 | |
| 27 | 339 | | | | | | | | 12 | |

METHOD AND SYSTEM FOR CONFIGURATION CONTROL IN TELECOMMUNICATIONS NETWORKS

CROSS REFERENCE TO RELATED APPLICATIONS

This application is the US national phase of PCT application PCT/EP2003/008702, filed 6 Aug. 2003, published 4 Mar. 2004 as WO 2004/019556, and claiming the priority of Italian patent application TO2002A000742 itself filed 23 Aug. 2002, whose entire disclosures are herewith incorporated by reference.

FIELD OF THE INVENTION

The present invention relates to controlling the configuration of the various elements (nodes, interfaces between nodes, etc.) included in a telecommunications network and in particular relates to the possible accomplishment of a centralized function for controlling the configuration of a telecommunications network, such as a mobile telecommunications network. Nonetheless, the uses of the invention are not limited to this specific application.

BACKGROUND OF THE INVENTION

In general, the activities of controlling and designing the configuration data of a telecommunications network are particularly complex and delicate.

Among the reasons for the complexity of the activities, the following can be recalled:

most interventions in the network, such as the insertion of a new node (for instance, the so-called MSC/VLR of a mobile radio network), the introduction of a new service or the maintenance of an existing service generally implies the need to define/redefine the data pertaining to the new/pre-existing nodes;

given the possible centrality of a node within the network architecture (again considering the example of a MSC/VLR of a mobile radio network), the erroneous definition of configuration data of a node and of the criteria for interaction with the nodes destined to co-operate with the node itself can lead to deleterious effects in terms of service availability and possible consequent loss of revenues;

in a network, even a small sized one, a great quantity of configuration data is present which, in addition to being delicate and having strategic value, are subject to being updated very frequently, and the activities of designing and/or configuring the nodes and the other elements of the network are generally carried out (even when the nodes are based on the same technology) at different times by different subjects.

Wholly identical functions can therefore be implemented according to equivalent but not exactly identical principles and criteria, giving rise—within the network—to a lack of uniformity which is always negative; this also taking into account the fact that, in any case, different network operators have the tendency to integrate in the same network nodes and/or node components based on different technologies.

It is therefore necessary to provide network operators with such instruments as would enable them to:

ensure that the configuration data of the operating facilities comply with the rules set out by the network operators in the technical design standards, standardize the configuration of the systems thanks to the identification, on one hand, of the configuration data destined to be identical for all systems and, on the other hand, of the data that cannot be, given their dependence on the location of the system within the network;

optimize the performance of the systems, identifying and eliminating any redundancies in the configuration data, and unite in a single entity the function of defining the reference configuration rules, leaving to other entities (possibly distributed over the territory if the network is a large one) the action of verifying whether the configuration of the nodes complies with the rules.

In this regard it should be noted that there is a strong interdependence among the various categories of the configuration data; therefore, it is necessary to have instruments available to check the effects due to the variation of the generic data category: a typical example regards numbering analysis, which is strongly interdependent with billing analysis.

There is also a strong implicit interdependence between the configuration data of different nodes in the network. In other words, the correct treatment of a service within each network node considered individually fails to guarantee in absolute fashion the correct operation of the service within the network in its entirety. Design configuration choices on the individual network nodes, which in themselves may be functionally correct, may in fact be found incompatible when the nodes are interfaced. When verifying the operation of network services or performance, oftentimes there are no absolute correctness criteria to be applied to the individual node, but it is necessary to use correctness criteria relating to the operation of the other nodes in the network.

For instance, it is known among those skilled in the art that an error in a configuration data item in one node can cause malfunctions in the network services that manifest themselves only outside the node itself. The node whereon an error is observed is not always responsible for the malfunction. Therefore, it is necessary to obtain instruments that have the capability of checking the behavior induced on the network by the configuration data, both at the level of the individual node and at the level of the entire telecommunications network in which the node is inserted.

In addition, the semantic distance between the punctual configuration data item and the effect it has on the behavior of the network can be very large. The network operator can detect an error in a configuration data item but not be able to estimate its severity; conversely, he may observe an undesired behavior in the network but not be able to determine which error in a configuration data item in a node may have caused it.

Therefore, it is important to have instruments available that are able to offer a vision both of the global high level behavior of a network service, and to perform a low level analysis of the individual configuration data item in a specific node, aiding the user in semantically connecting the different levels of detail of the analysis.

Traditional techniques for checking the correctness of configuration data are generally based on the preventive manual checking of sets of commands containing modifications to configuration data, on checks through software tools of compliance with the correct syntax of the configuration commands, or on making test calls to test the proper operation of the service downstream of the transmission of the configuration data in the network.

These techniques do not allow one to identify in a wholly satisfactory manner possible errors in the configuration data, either because they are too costly in terms of time and resources or because they are not exhaustive. For example, very often modifications to configuration data are made during the night time hours under conditions of light network loading. Tests conducted in this network condition may not be exhaustive since, under conditions of heavier loading, the network may for instance perform different routings following second or third choice routing paths because of the saturation of the main routing due to intense traffic. It is therefore important to provide network operators with instruments that are able to give answers as to the correctness of configuration data more accurately and exhaustively than those that can be obtained with traditional techniques and in compliance with the time lines required for activating network services.

In view of the deleterious consequences of errors in the configuration data, it is advisable on one hand to be able to perform checks prior to updating data in the network and on the other hand to extend the checking action passing from a mere function of analysis and verification to a function of (re) designing the configuration data of the nodes in accordance with predetermined rules.

OBJECT OF THE INVENTION

The object of present invention is to provide a solution able to overcome the limitations set out above and to meet the requirements described previously in a wholly satisfactory manner.

SUMMARY OF THE INVENTION

According to the present invention, this object is achieved thanks to a method having the characteristics specifically described below. The invention also relates to the corresponding system as well as the corresponding computer program product able to be directly loaded into the internal memory of a digital computer and comprising portions of software code to implement the method according to the invention when the product is run on a computer.

BRIEF DESCRIPTION OF THE DRAWING

The invention shall now be described, purely by way of non limiting example, with reference to the accompanying drawings, in which.

SPECIFIC DESCRIPTION

In the currently preferred embodiment, the solution according to the invention allows one to implement a set of techniques that allow, adopted either separately or in mutual combination, to manage and check the configuration data of the elements included in a telecommunications network. This providing in particular the ability to simulate the behavior of the network nodes and of other elements of the network in the absence of interaction with the elements subjected to checks.

In particularly advantageous fashion, the characteristic elements of the solution according to the invention are able to coexist and co-operate with more traditional control techniques.

A first example in this regard is given by the configuration control technique aimed at verifying the configuration of the data of the node, comparing it with a reference standard.

To achieve this type of control in a system of the type illustrated herein, typically the configuration data in operation are drawn from one or more files associated with the node (commonly called printouts) and the data in operation are compared with the reference data.

This first technique is simple to implement, as it requires to compare the equality of two sets of data without making any simulation of the behavior, for instance, of the nodes. Each discrepancy between the data measured in a node and the reference data constitutes an error in the configuration data, which can be removed by generating a packet of modifications to the configuration data such as to make them identical to the reference.

This solution is suitable to solve data standardization problems. However, it is not—in itself—suitable to meet all indicated requirements: to be effective, the reference standard must be at the same level of detail as the configuration data; moreover, this type of checks is not applicable when the set of data to be checked does not have the objective of being (or cannot be) identical in all nodes in the network; lastly, there is no immediate correlation between the error detected in the configuration data and its consequences on the operation of the service and on the performance of the network.

Another technique is instead based on the simulation of the behavior of the functions of the node by means of so-called "functional checks" with the goal of verifying the operation of the node by comparing the emulated behavior with the behavior specified by the reference standard.

In this regard it should be recalled that in general a network node is constituted by a set, which can be quite complex, of co-operating functions.

For example, there are functions that manage:

user profile analysis, calling numbers and called numbers analysis, signaling routing analysis, call routing analysis, call billing analysis, and end of selection analysis.

To each functionality are generally associated one or more configuration files (with known format, called node printouts) that indicate the values of the parameter of the functionality itself.

It is possible to request from the generic node the configuration of the functionality of interest starting from the so-called printout.

To allow functional checks, software functions (called "analyzers") are specified and realized, and each simulates the individual functionality of the node.

For example, with reference to call management, analyzers are used to simulate called numbers management, signaling routing, call routing, etc.

From the analysis of the global operating specifications of the node, procedures destined to exploit the aggregation of the analyzers to simulate the function of the node are specified. the procedures thus allows one to simulate a whole series of global behaviors of the node.

To simulate the execution of the generic procedure, the following input data are used:
  the configuration data in operation of the analyzers associated with the procedure and obtainable from the corresponding node printouts, and
  the input parameters for the global procedure.

The check verifies that the expected operation coincides with that obtained by executing the procedure for the node of interest.

To enable the user to simulate in step-by-step mode the generic function of the node, an environment is defined that allows one to:
  select the node of interest,
  select the analyzer of interest,
  configure the input data to the analyzer, and
  simulate the function in step-by-step mode.

This technique offers a solution that overcomes many of the disadvantages of the prior art. Comparing the expected and observed behaviors in a node by means of the simulation carried out with the analyzers, it is no longer necessary for the reference to be expressed at the same level of detail as the configuration data; moreover, it is not the equality of the data with respect to the reference that is checked, but rather the behavior which data induce on the node. This makes the technique effective even in contexts in which the configuration data do not have the objective of being (or cannot be) rendered identical on all systems. Moreover, since it is a check with a greater semantic content than that of the prior art, the correlation between the error detected in the configuration data and its consequences on the operation of the service and on the performance of the network is easier.

To the techniques described previously, the solution according to the invention allows one to add more advanced techniques, better described hereafter.

Some analyzers can lead to more than one possible analysis result, whereof only one is followed each time by the node in its actual behavior. The choice made by the node depends on the instantaneous conditions of the network.

One can take, by way of example, the analysis of routings for a network service: a call directed to a number can be routed, for the same final destination, following different paths, each with different priority, depending on the loading condition of the paths at the time of routing.

In the currently preferred embodiment, the invention provides for the introduction of a new simulative element that takes into account all possible analysis results corresponding to different possible states of the node, in order to use the results to obtain the simulation of the exhaustive behavior of the node, i.e. independently from the particular instantaneous network conditions.

With respect to the prior art, this development allows one to overcome the limitation given by the non exhaustive nature of the technique that calls for the execution of manual call tests conducted during night time hours (which verify the proper operation of the service only in the particular case of unloaded network), considerably increasing reliability and allowing an exhaustive simulative approach to configuration data management with respect to traditional techniques.

An additional enhancement is obtained by introducing a new element that is able to simulate the interaction between one node and the next in the traffic path.

This element serves as a simulator of the component useful for analyzing the interwork at the interface between the network nodes. For example, it simulates the network protocol interfaces used for signaling exchanging or call routing purposes ("interface/protocol simulators"). This new element allows one to pass from the simulation of the behavior of a node to the simulation of the overall behavior of the network in case of a particular service or performance.

To allow the user to simulate the complete behavior of the network, based on the configuration data present for a certain service in the network, an environment is defined that allows one to:
  select a traffic scenario and a starting system, setting determined initial conditions of the simulation;
  visualize all possible alternatives obtained by simulating the different nodes and the different interfaces that in any network condition will lead to the rendering of the service given the initial conditions set.

The coexistence of this technique with all techniques illustrated previously in the same instrument enables the user to fill the semantic distance between the punctual configuration data and its effect on the behavior of the network, offering both a vision of the high level global behavior of a service in the network, and the possibility to carry out a low level analysis of the individual configuration data item in a specific node, aiding the user in semantically connecting the different levels of detail of the analysis.

An additional simulative element allows one to apply to a configuration detected in the network a set of commands for modifying the configuration itself in the simulated environment alone, leading to a new version of the configuration data set for a single node or even for the entire network. On this new version of the configuration, all prior techniques can be applied.

This new simulative element therefore allows one to apply all prior techniques not only to the verification of existing configuration data, but also to the data consequent to a set of appropriate configuration commands applied to the existing configuration before their actual insertion in the network node.

This technique can be used effectively together with the prior ones in design as well as control activities to provide a sort of analysis of the impact in the network of the introduction of a certain set of modifications to the configuration data, highlighting any errors and consequent degraded services before their actual introduction into the nodes constituting the actual environment.

Figure 1:
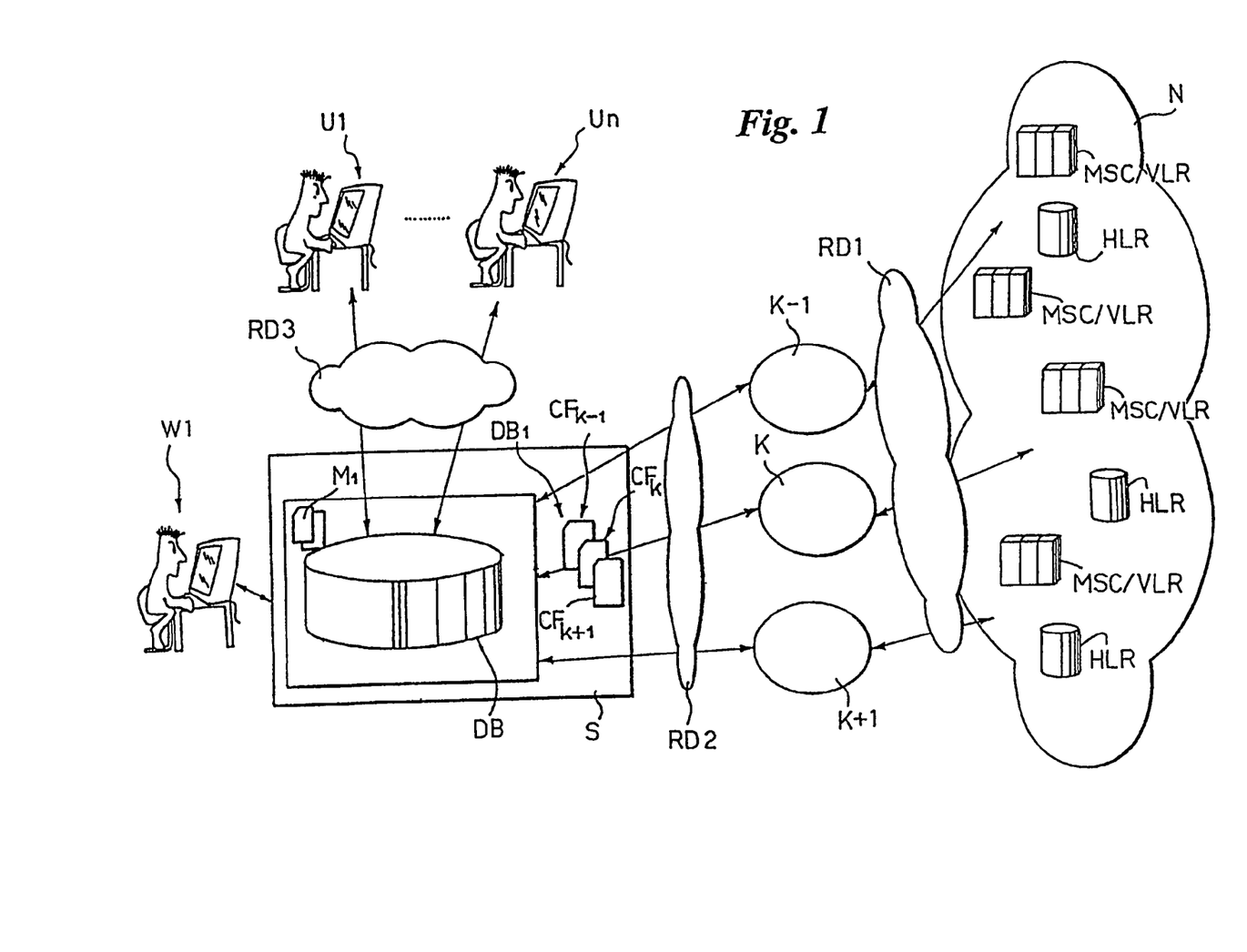
FIG. 1 shows, in the form of a functional block diagram, the possible architecture of a control system, integrated in a mobile radio network, operating according to the invention.

Moving now to a detailed examination the accompanying drawings, in FIG. 1 the reference N globally indicates a telecommunications network represented—in the application example whereto (without thereby limiting the scope of the invention) reference shall constantly be made hereafter—by a mobile radio network. FIG. 1 schematically shows various MSC/VLR (Mobile Services Switching Center/Visitor Location Register) and HLR (Home Location Register) elements, connected, through a data network RD1, to respective management systems, respectively indicated as k−1, k, k+1.

As stated, although the solution according to the invention was developed in view of its possible application to controlling the configuration data of a mobile radio network, reference to the possible application must not be construed as limiting the possible scope of the invention, which is altogether general.

The general structure and nature of the network can be any. This holds true in particular for the structure and the interconnection modes of the various nodes included therein. Specifically, the fact that three management systems are represented, distinguished by the references k−1, k and k+1 is purely by way of example and is in no way destined to express a connection or sequential constraint of any sort existing among the systems.

This stated, referring (again by way of example) to a mobile radio network, within the network nodes particular relevance is assumed by the management systems . . . , k−1, k, k+1, . . . typically called OMC (Operation and Maintenance Center). Here are collected the files (called node printouts) with the configuration data of the network nodes.

For the purposes of the present invention, it will be sufficient to recall that the configuration data characteristic of each node in the network are usually organized in the form of ASCII files that may reside in the management system . . . , k−1, k, k+1, . . . and are therefore able to be collected at the level of a data base DB destined to constitute the heart of the server S of the system according to the invention.

The collection of the files containing the configuration data of each network node can be carried out by the server S remotely, for instance according to the typical transmission modes of a data network (RD2).

Consequently, within the data base DB residing in the server S (or otherwise available to the server S itself) a portion of data base is dedicated, indicated as DB1, in which are collected the configuration data associated with the nodes, extracted from the configuration files CFk−1, CFk, CFk+1 . . . drawn from one or more node printouts.

The persons versed in the art will appreciate that, although—for the sake of simplicity in the description—the files in question are indicated herein with generic subscripts . . . , k−1, k, k+1, . . . , this designation must in no way be construed as indicative of a correspondence between files and management systems. This is because, for instance, each system may manage several nodes, each with multiple files.

Another portion (indicated as M1) of the data base DB is dedicated to storing the reference data or behaviors, used as a "model" for the entire network.

Otherwise stated, the model M1, depending on the technique used on each occasion, may represent: a set of configuration data that are to be identical on all nodes of the network in configuration checks cases; a set of expected behaviors for a node in the case of functional analyses; a set of exhaustive behaviors of all nodes that can be traversed in the case of simulation of a determined service over the entire network.

The model M1 is organized by a network manager that creates the configuration model M1 through its own work station W1 which interacts, at the local network level or remotely, with the server S.

The system represented herein allows, in the first place, to verify that the configuration data are all consistent (virtually identical to each other, at least in the parts destined to be so, because they are not specific of a particular node) and in any case in accordance with the configuration specifications defined by the "model" configuration.

FIGS. 2 through 5 respectively show the general diagram of the control, the model M1, the format of the configuration data and the type of outcome expected.

Figure 2:
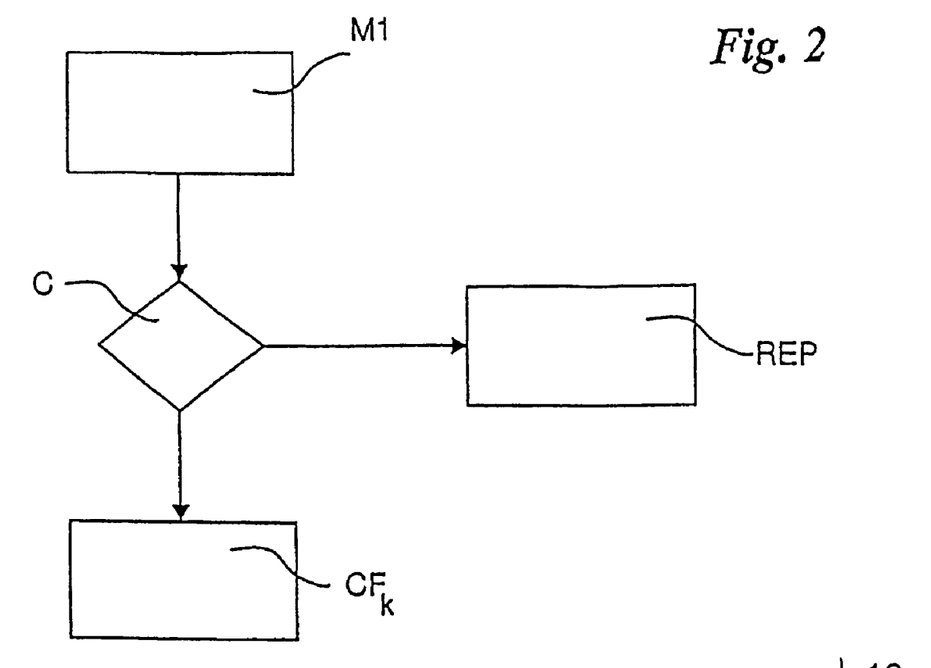
FIG. 2 shows, in the form of a functional block diagram, a configuration check being performed in a system according to the invention.

The diagram of FIG. 2 shows the criteria whereby, within the scope of a system according to the invention, a configuration control is performed over the data relating to any functionality of the node.

Figure 3:
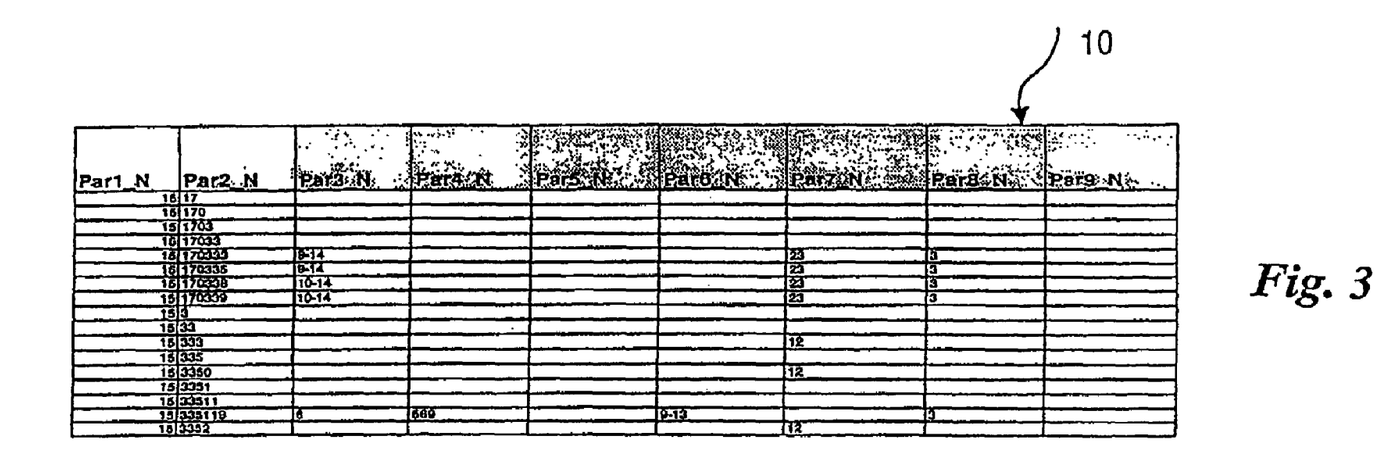
FIGS. 3 through 5 show some examples of data structures involved in the check of FIG. 2.
Figure 4:
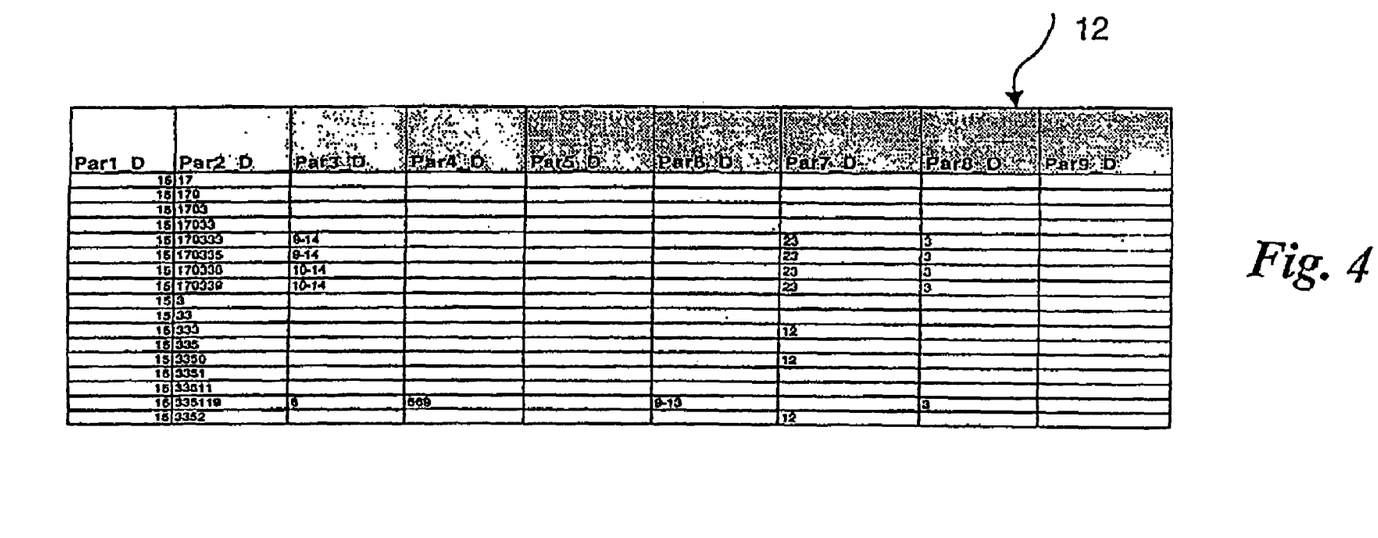

In essence, the control corresponds to a verification function C carried out by comparing:
configuration data corresponding to the standard (model M1), able to have a structure of the type shown in 10 in FIG. 3, and
the actual configuration data corresponding to the data in operation collected in the corresponding node printout and having, in the representation format internal to the system, a structure like the one shown in 12 in FIG. 4.

Figure 5:
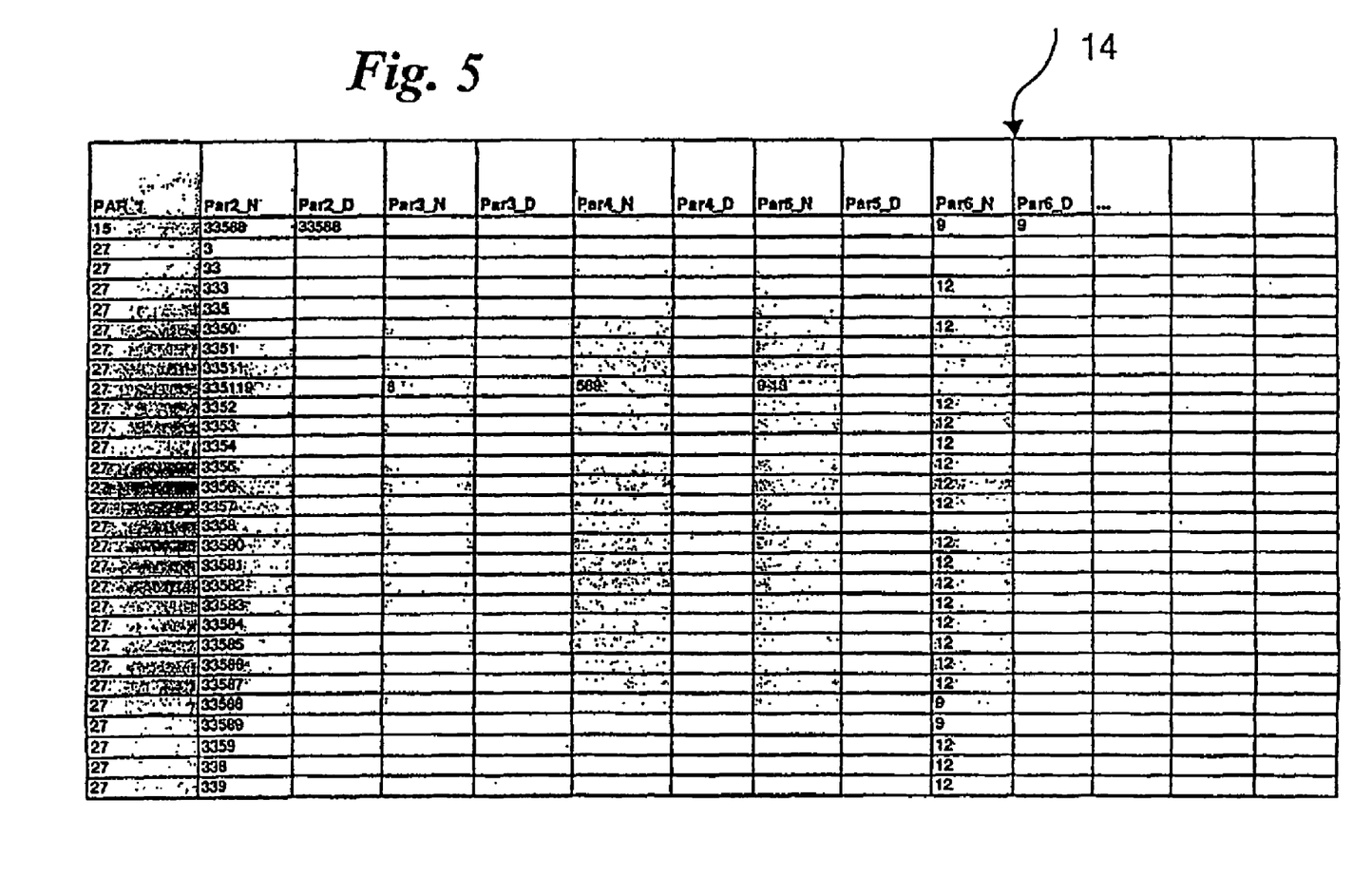

Starting from the comparison function indicated as C, the system generates a report REP having the structure represented in 14 in FIG. 5. In practice, the report in question has a first has a first column showing an identifier of the configuration data item followed by a sequence of pairs of parameters where the first is the reference data item (postfix N, i.e. Norm or standard) and the other one the parameter in operation (postfix D, i.e.

Data item in operation).

In this way, the report 14 allows one to highlight the following types of out-of-alignment conditions:
data in operation in excess with respect to the reference;
missing data in operation with respect to the reference, and
different values of the parameters for the same configuration data item.

In the currently preferred embodiment of the invention, the system is configured in such a way as to extend the control action beyond the mere step of verifying the actual situation. This is achieved by performing a function of reconfiguring the nodes of the network, aimed at causing any configuration data exhibit dismorphic characteristics with respect to the data of the "model" to be modifiable to attain the desired conforming condition. All proceeding with the reconfiguration of the nodes accomplished remotely, for instance by transmitting to the management system . . . , k−1, k, k+1, . . . of the node involved on each occasion the commands and the data necessary to proceed with the reconfiguration.

It will be appreciated that this preferred mode of organizing the system according to the invention allows one to perform a network reconfiguration action. the action constantly assures that, for instance, all nodes in the network are configured in mutually uniform fashion and in accordance with the reference specifications.

This operating mode allows constantly to follow the evolution of the network deriving, for instance, from the addition of new nodes and/or from the addition (or elimination) of determined functions of one or more nodes with the consequent reconfiguration of the entire network.

This, it should be observed, also when the nodes of the network are not all based on the same technology.

An important element of the solution described herein is given by the ability to simulate (by means of corresponding functions) the generic functionality of the nodes. This allows one to avoid any invasive impact on the network nodes.

A node can generally be modeled as a set of co-operating functions. Within the scope of the solution described herein, functions that replicate the functions of the node have been defined and implemented.

The functions that emulate the generic functionality of the node are defined in general-purpose fashion and the information required to simulate the behavior of the functionality of the node of interest are represented by:
the input data for starting the function, and
the configuration data present in the node printout associated with the functionality.

In this way it is possible to simulate the behavior of the generic functionality of the generic network node avoiding any invasive intervention on the network N itself.

The solution according to the invention therefore provides for the afore the verification to be performed by means of simulation according to the criteria better described hereafter.

FIGS. 6, 7, 8, 9, 10 and 11 refer to the criteria with which, within the system according to the invention, are performed the functional checks destined to verify that the expected operation of the node coincides with the one obtained from the execution of the corresponding procedure for the node of interest.

In essence, the solution described herein is based on the performance of checks that can be accomplished no longer by comparing the actual configuration with the reference configuration, but comparing the set of expected behaviors of the node with the actual behavior computed by means of functional analyses that use the simulative method.

Figure 6:
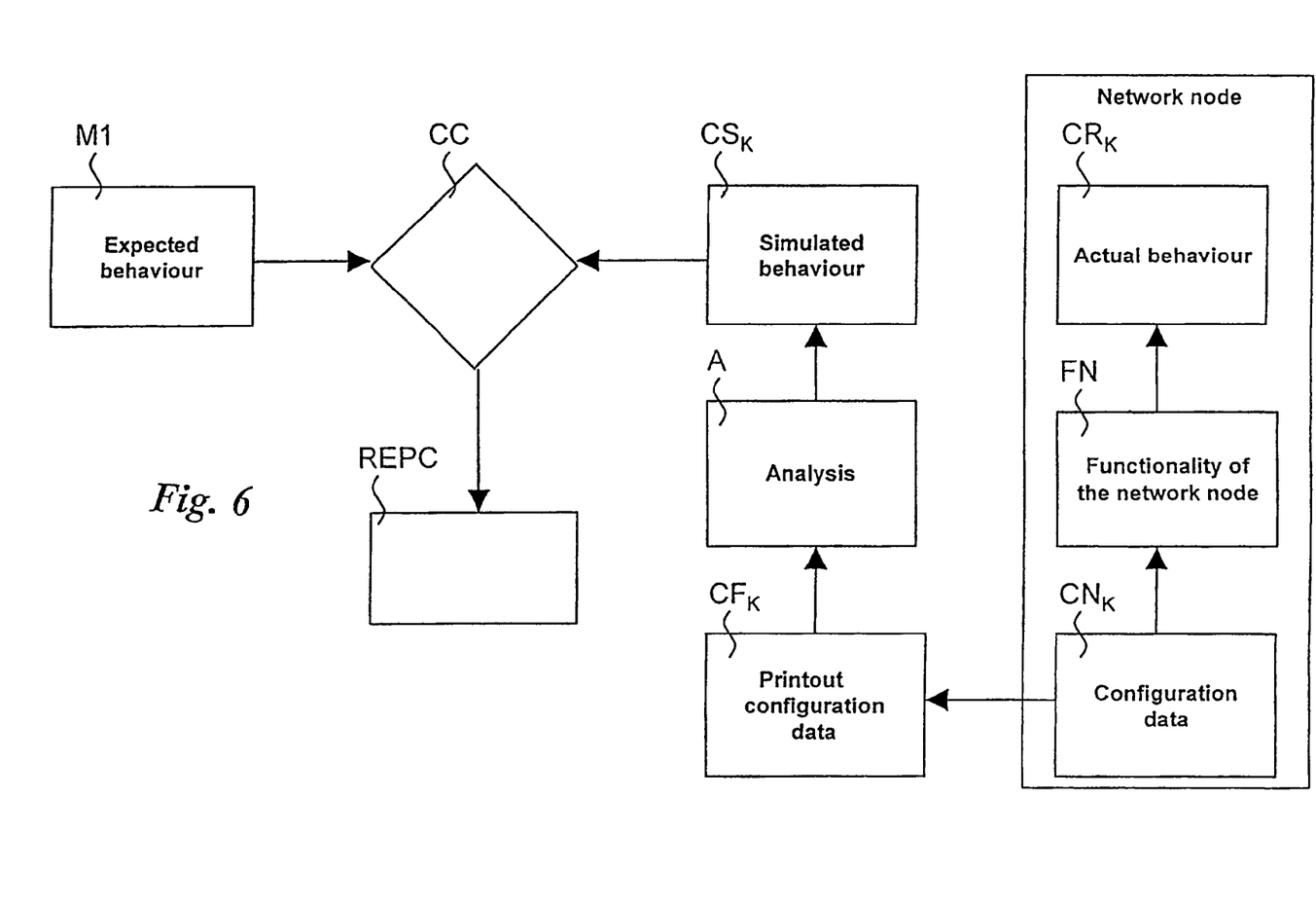
FIG. 6 shows, in the form of a functional block diagram, a functional check being performed in a system according to the invention.

The diagram of FIG. 6 shows the criteria with which, within the scope of a system according to the invention, are based the functional checks of the data relating to any functionality of the node.

Within the network node, the configuration data present CNk are used by the related functions and influence the behavior of the node itself.

The system described herein is able to acquire the configuration data CFk extracted from the printouts and, by means of simulation modules called analyzers A, to simulate the behavior CSk that the node assumes as a consequence of the configuration itself.

Figure 7:
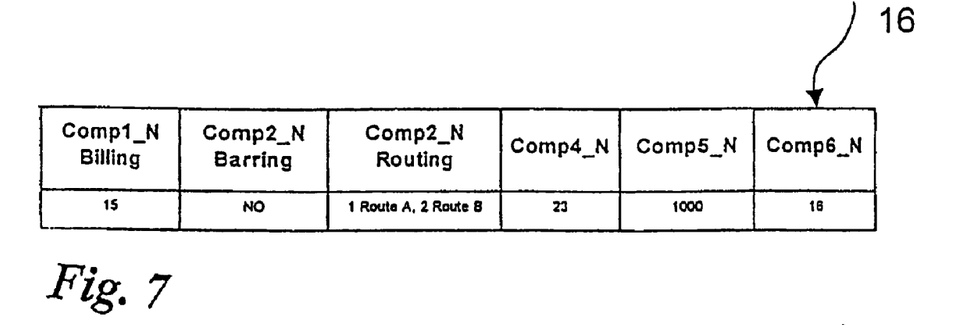
FIGS. 7 through 9 show some examples of data structures involved in the check of FIG. 9.
Figure 8:
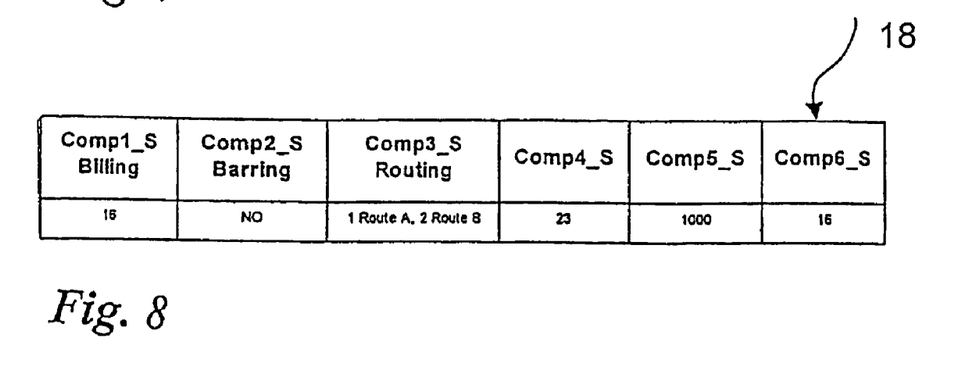

Lastly, the control corresponds to a verification module CC that operates by comparing:
a set of expected behaviors (model M1), able to have a structure of the type shown in 16 in FIG. 7, and
a set of simulated behaviors obtained as the result of the functional analyses and having, in the representation format internal to the system, a structure like the one shown in 18 in FIG. 8.

Figure 9:
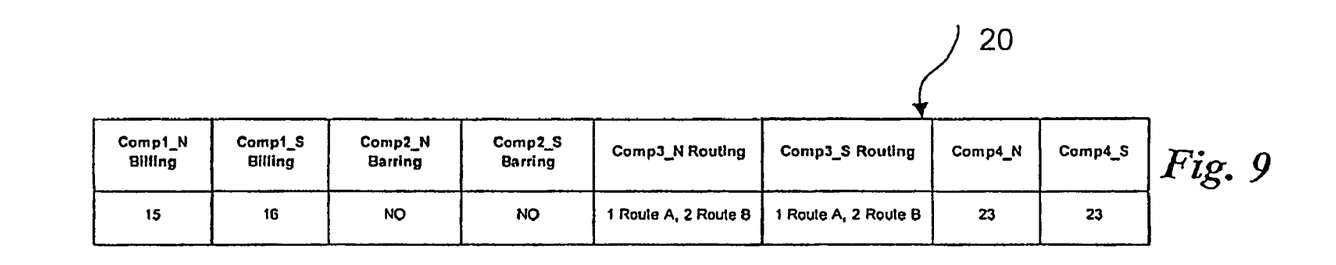

Starting from the comparison function indicated as CC, the system generates a report REPC having the structure represented in 20 in FIG. 9.

In practice, the report in question has a sequence of pair of behaviors where the first behavior is the reference data item (postfix N, i.e. Norm or standard) and the other one is the simulated behavior (postfix S, i.e. Simulated). The diagram of FIG. 6 also shows additional function blocks, indicated as FN and CRk, representative of the functions of the network node corresponding to the configuration data CNk and to the actual behavior of the node in question.

Figure 10:
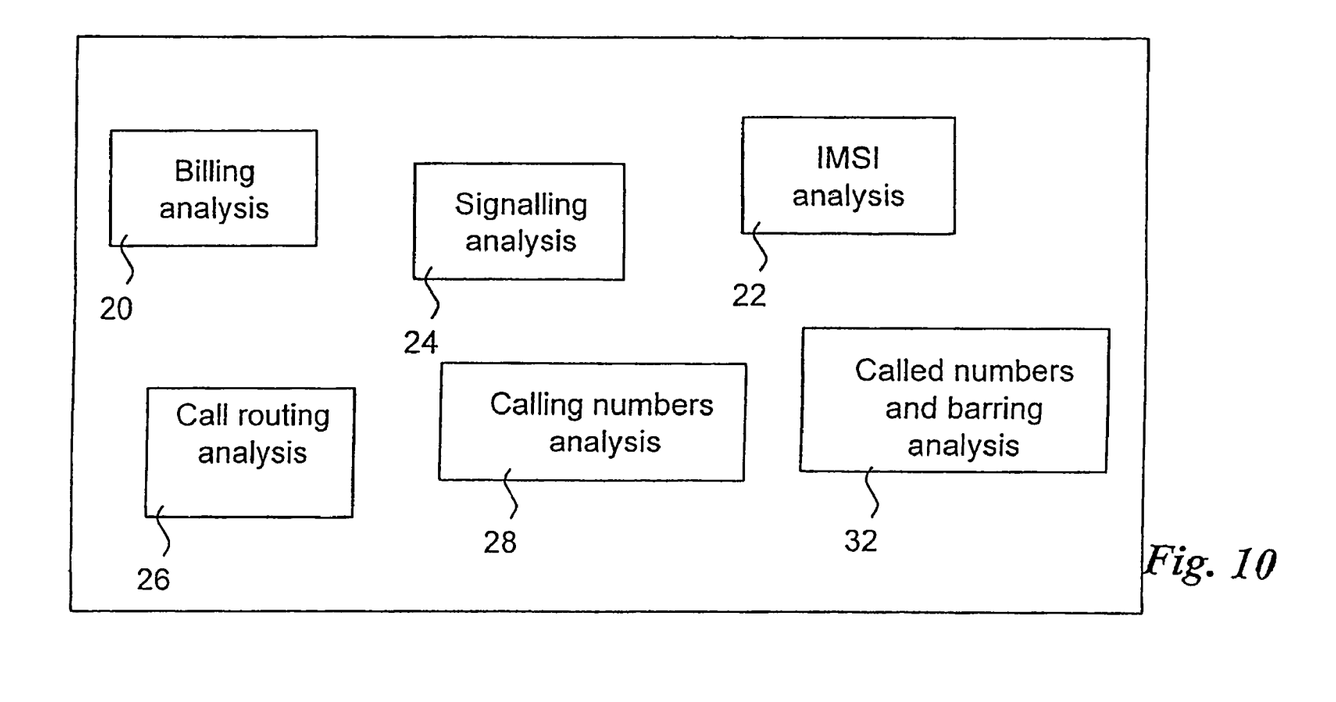
FIG. 10 shows the structure of the functions with which the node can be modeled for the simulation aims of the invention.

The diagram of FIG. 10 shows the typical organization of a MSC/VLR of a mobile radio network, which can be seen as a set of co-operating functions destined to manage, for example, the calling numbers, the called numbers, signaling routing, call routing, call barring, call billing and end-of-selection management. In essence, the solution according to the invention is based on the creation, within the database DB, of a set of simulation functions at the software level, each of which was built based on the set of rules and criteria with which a determined node technology accomplishes a node functionality.

For example, they can be, with reference to the MSC/VLR case mentioned previously, of functions that at the software level emulate:
billing analysis (20),
analysis of the identifier called International Mobile Subscriber Identity or IMSI (22),
signaling analysis (24),
call routing analysis (26),
calling number analysis (28), and
called numbers and barring analysis (32).

Figure 11:
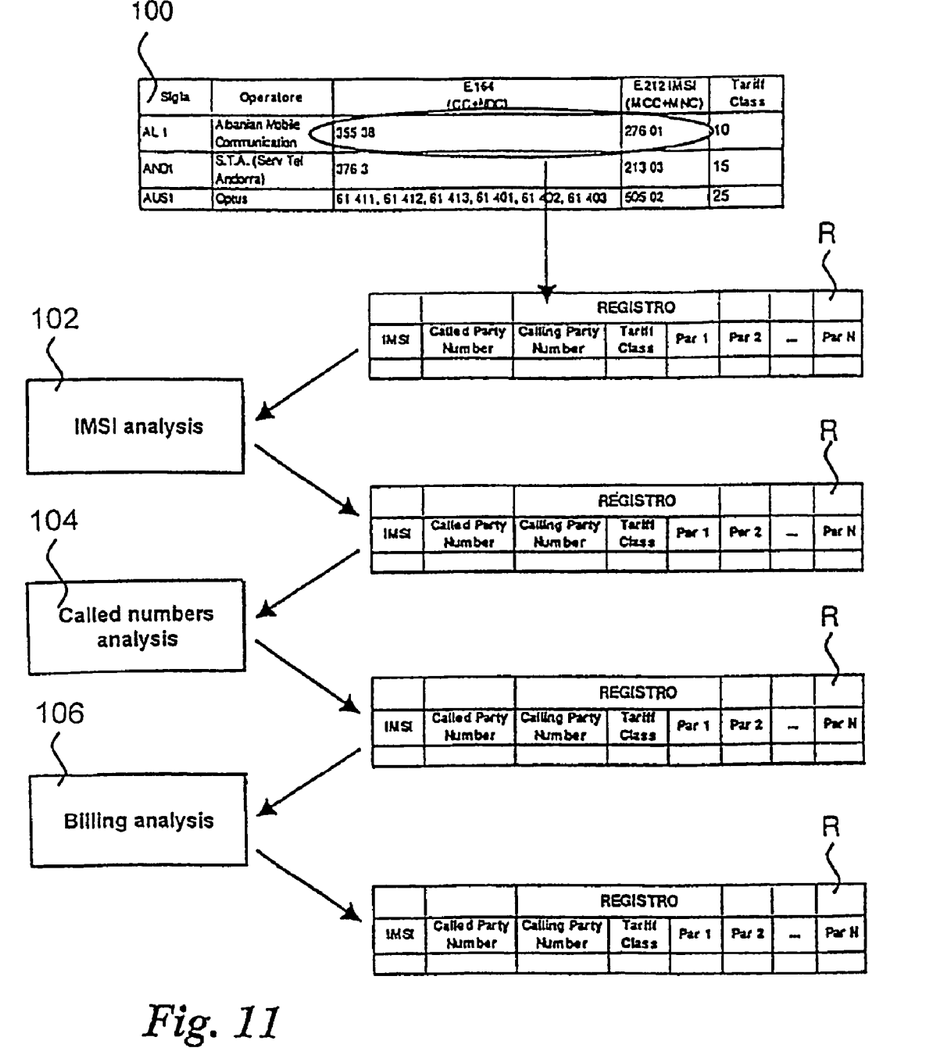
FIG. 11 shows an example of functional analysis carried out in a system according to the invention.

FIG. 11 shows the execution of the functional analysis carried out exploiting a register R which is nothing else than the set of variables able to represent:
the input data of the first function in the chain,
the data obtained as a result of the generic function and able to represent the input data for the subsequent function, and
the data obtained as the final result of the complete chain.

For example, FIG. 11 shows a typical functional analysis sequence conducted in relation to checking the handling of the calls of users who use the service called "International Roaming".

In particular, the check is aimed at verifying a foreign GSM user's ability to complete a call directed to a number in his/her own country of origin.

After from a list (step 100) the node, an IMSI number and a called number in the country of interest, and after introducing the corresponding information in the register R, are activated in sequence the analyzers corresponding to the respective functions of the network node. In this case, the analyzers are activated in order for the analysis of the IMSI identifier (step 102), the analysis of the called numbers and of the barring (step 104) and the analysis of billing (step 106).

It will be appreciated that the various analyzers exploit as configuration data:
the input data to activate the analyzer in the case it is the first of the chain,
the input data obtained from an analyzer activated previously, and
the configuration data obtained from the printout associated with the analyzer.

Figure 12:
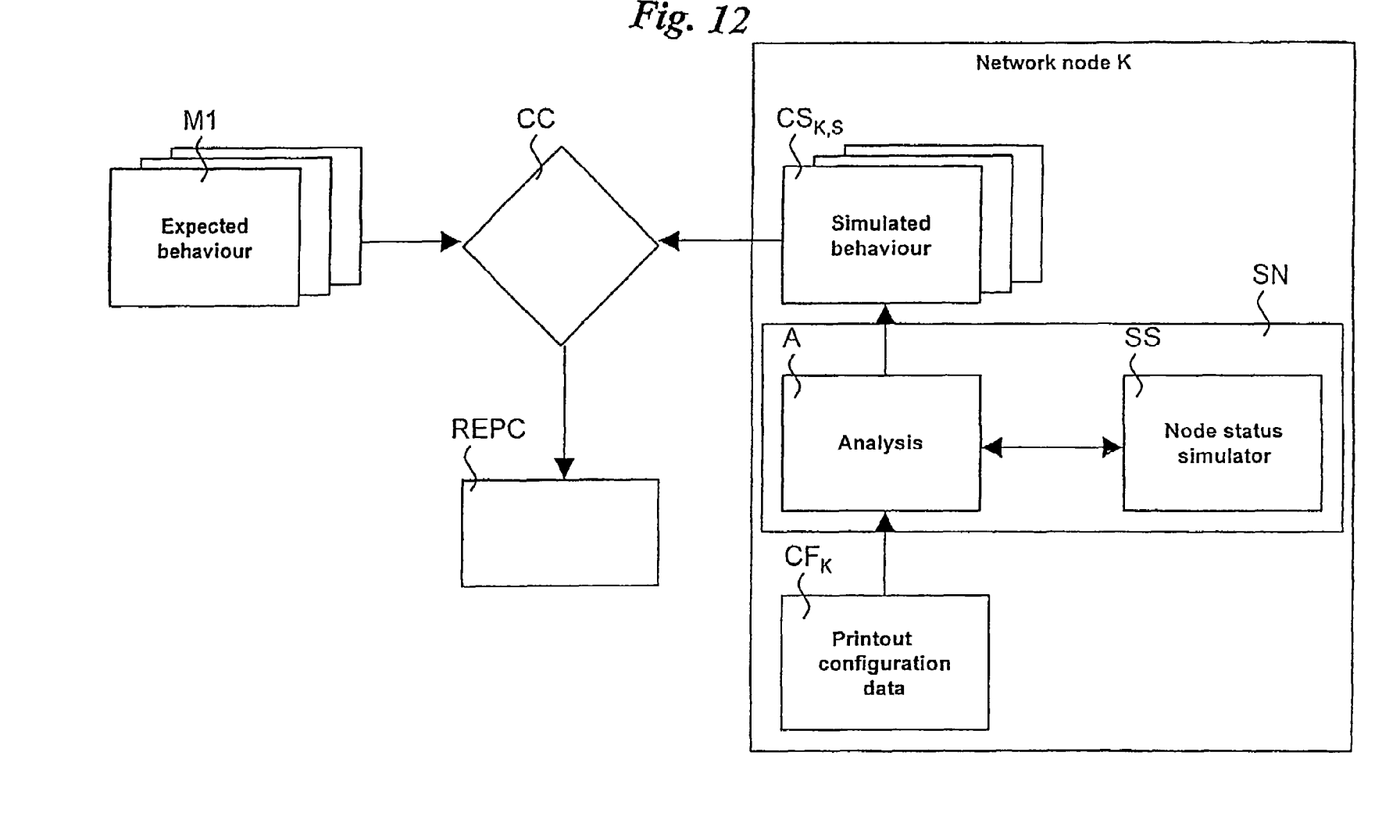
FIG. 12 shows, in the form of a functional block diagram, the execution of a functional check involving the node state simulation component in a system according to the invention.

FIG. 12 shows the conduct of a functional control involving the node state simulation component.

The simulator SS of the state of the node does not simulate an existing function of the real node but simulates the occurrence of the different environmental conditions that would influence the result of the activation of a functionality of the node and that may also influence the invocation of the subsequent functions.

If for instance the result of the analysis of the routing of a certain called number leads to different possible solutions with alternative choices depending on the actual state of the resource of the actual node, the actual node would terminate the analysis following the only choice consistent with the actual state of the resources at that instant.

The simulator of the node state, instead, generates a set of possible states s1, . . . , sn each of which corresponds to a situation that may lead to a different result of the analysis. In the currently preferred embodiment of the invention, to the different states are associated as many instance of the register R.

If the simulation continues downstream of the aforementioned analyzer, the simulation will have to be continued branching the analysis off starting from the n behaviors deriving from each possible state. The final result, therefore, is a set of simulated behaviors CS, k, s associated to the node k in the state s.

In the execution of a check, the simulated behaviors are compared through a decisional component CC to the possible expected behaviors expressed in M1. The result is, as in the previous cases, an REPC report that indicates the differences between the expected behaviors and the simulated behaviors.

From the functional point of view, the set constituted by the analyzers A and by the simulator of the node state SS can also be considered a node simulator macro-block, called SN, destined to operate on the configuration data CFk extracted from the printout.

Figure 13:
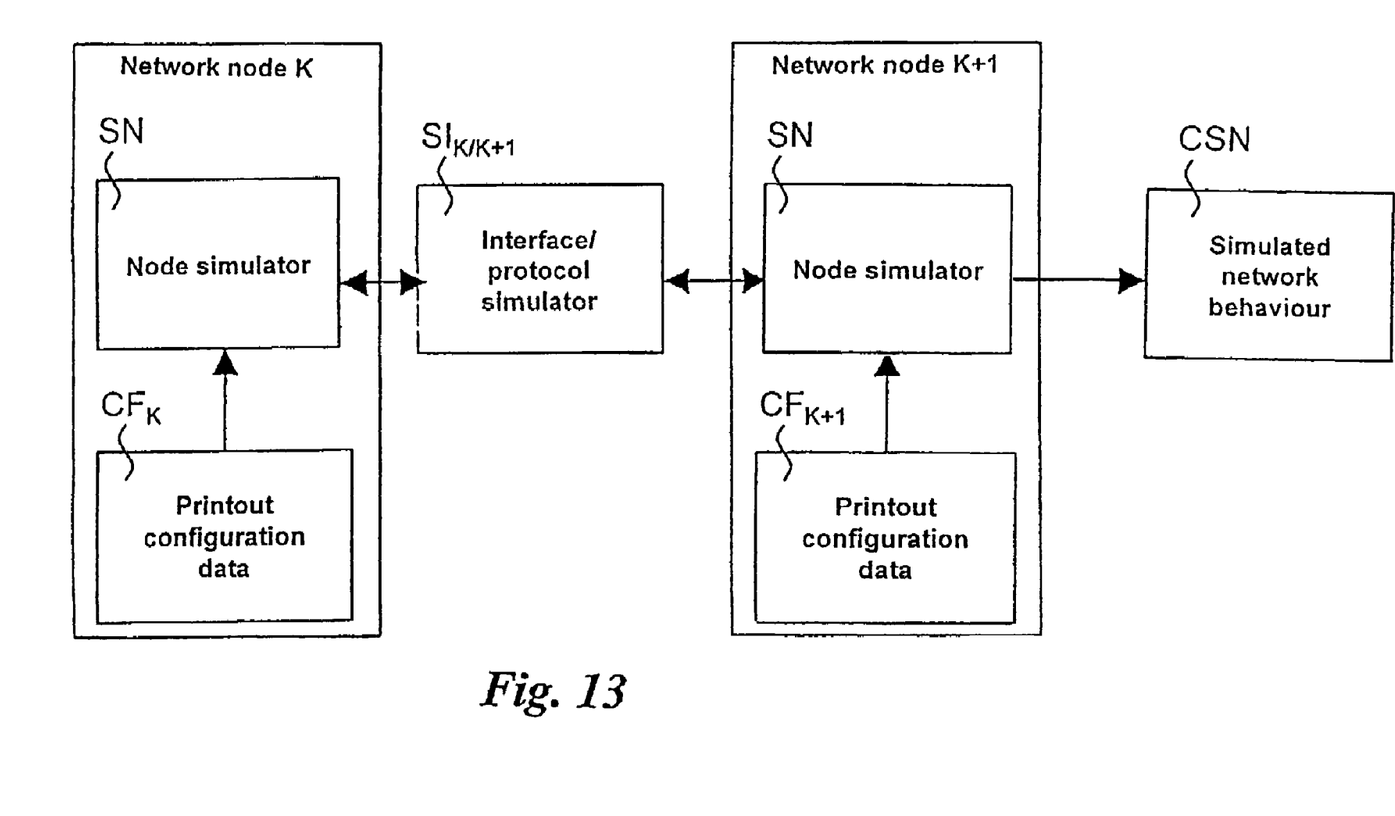
FIG. 13 shows, also in the form of a functional block diagram, the execution of an analysis at the level of the entire network using the interface/protocol simulator.

FIG. 13 refers to the criteria with which, within the system illustrated herein, are accomplished the functional checks destined to verify the expected behavior of a service or of a performance of the network as a whole.

In essence, the solution described herein is based on operation checks no longer accomplished as described above on the individual nodes of the network considered separately, but on the behavior of the nodes upon their interfacing and of the interwork for the realization of the performance or of the services.

The diagram of FIG. 13 shows the criteria for the execution of the functional checks of the network services.

In a generic network node k, the configuration data CFk extracted from the printouts are used by the related simulation functions SN of the behavior of the node and influence the behavior of the node itself in the rendering of the service.

It is then supposed that for the rendering of the service the node k interfaces with the node k+1 by means of appropriate network protocols.

The system illustrated herein is able to simulate the rules for the interaction and interface between the nodes by means of appropriate functions SIk/k+1, which then in turn enable the simulation of the behavior of the node k+1 given the particular rendering of the service which takes into account the behavior at the interwork that occurred with the node k.

The final result is the behavior of the network CSN resulting from the behavior of. the individual network nodes and, thanks to the simulative interfacing element SIk/k+1, from the mutual interwork that influences the behavior of the nodes themselves.

These simulated network behaviors can be compared to the expected network behavior M1 from a decisional component CC. The result is, as in the previous cases, a report REPC that indicates the differences between the expected behavior and the simulated behavior.

Figure 14:
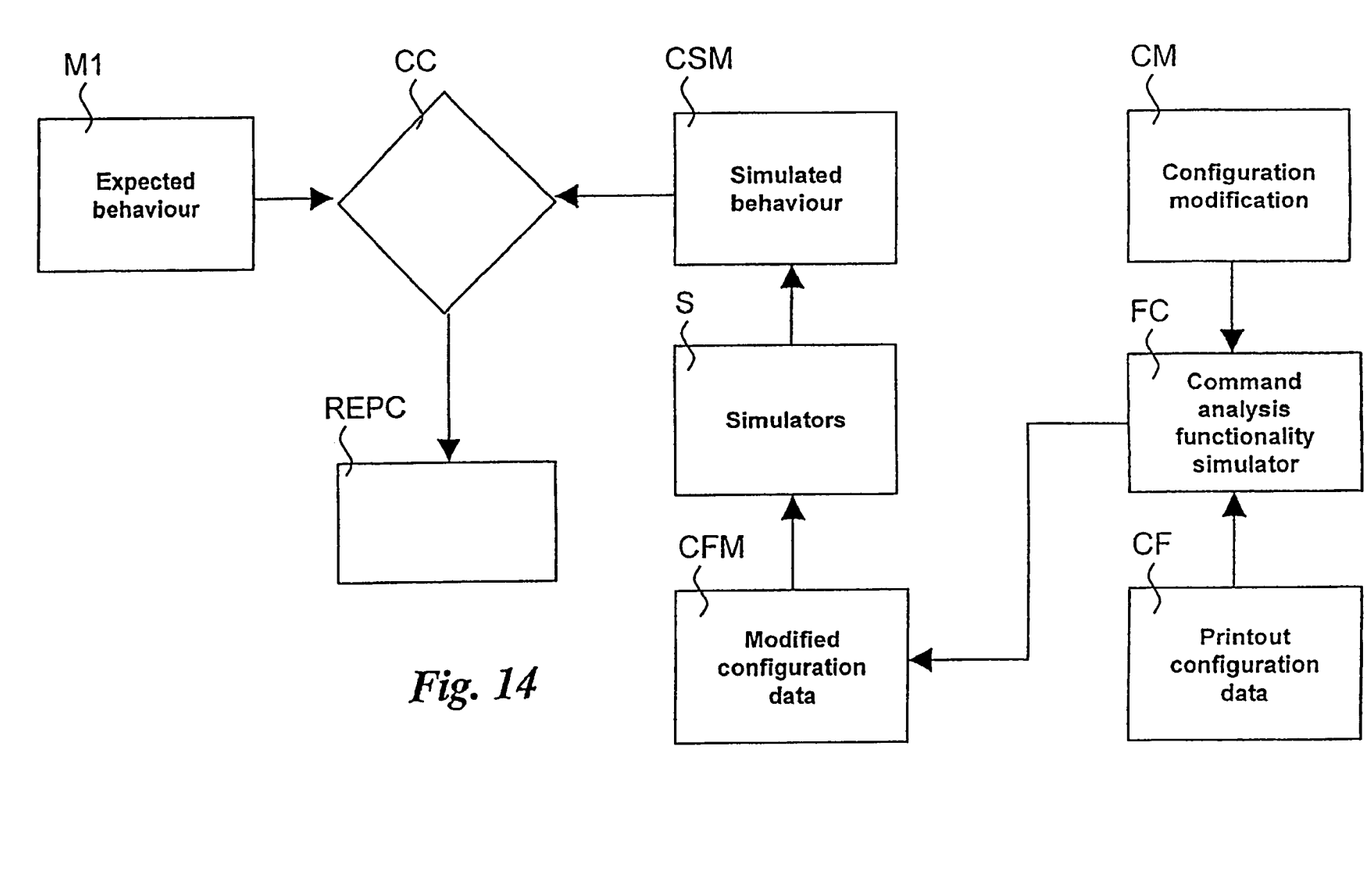
FIG. 14 shows, again in the form of a functional block diagram, the application of the various techniques described also to a possible future configuration built by applying only in the simulated environment a set of commands for modifying the current configuration.

FIG. 14 refers to the criteria with which, in the system described herein, the previous techniques are applied to a future configuration network instead of to the current configuration.

<COMMENT: Detail WHAT-IF Analysis>

This way of proceeding allows one to meet the requirement of performing data checks before their actual introduction in the network, allowing the analysis of the impact that a modification to the node configuration data will bring to the behavior of a single node or of the network.

An element FC, able to simulate the command analysis functionality, allows one to apply to a configuration CF detected in the network and extracted from the printouts a set of commands CM to modify the configuration itself in the simulated environment alone, leading to a new version CFM of the configuration data for a single node or even for the whole network. On this new version of the configuration can now be applied all previous techniques.

This way of proceeding can be freely combined with the various techniques described above; therefore the new CFM configuration can refer to a subset of the configuration data of a node, up to all configuration data of the nodes of the whole network. The new configuration can be analyzed simply through the analyzers, or be subjected to configuration checks, exhaustive functional checks, checks of the operation of a network service on all nodes and so on.

In the currently preferred embodiment of the invention, the control/simulation functions are activated by a plurality of terminals or work stations U1, . . . , Un distributed on the territory and able to interact remotely with the system server S for instance with data network RD3 communication modes. All this, with the stations U1, . . . , Un usually being inhibited from interaction with the model configuration M1 whose definition is left exclusively to the station W1. This need to distribute the work stations U1, . . . , Un over the territory is felt less acutely if the system is configured in such a way as to be able to accomplish in centralized fashion also the (re) configuration of the nodes starting from a single control station. In this latter case, it is also possible merge in a single station (such as the station W1) the functions of general network supervision and of starting the simulation functions. In the diagrams of FIG. 1 the functions are instead shown to be attributed in distinct fashion to the station W1, on one part, and to the stations U1, . . . , Un, on the other part.

Each of the stations U1, . . . , Un is usually able to perform at least the following operations:
  finding the current configuration of a node or of multiple nodes by importing their printout, and
  requesting the execution of configuration checks or functional checks that exhaustively verify the behavior of the nodes, or requesting network functional checks and visualizing the outcomes obtained in the form of reports.

Each of the stations U1, . . . , Un is also able to start the simulation to verify a determined functionality of a node.

In the currently preferred embodiment of the invention, the stations U1, . . . , Un also have the ability to simulate in step-by-step mode the generic function of the node undergoing verification.

All this is done in an environment that allows one to:
  select the node or nodes of interest;
  select the analyzer of interest,
  configure the input data of the analyzer,
  configure (in transparent fashion for the user) the analyzer exploiting the configuration data from the corresponding printout,
  simulate (possibly with step-by-step mode) the related function, and
  analyze the results of the analysis.

To enable the simulation of the complete behavior based on the configuration data present for a certain network service, an environment has been defined that allows one to: select a traffic scenario, a starting system and setting determined initial simulation conditions; display all possible alternatives obtained by simulating the different nodes and the different interfaces that under any network condition will lead to the rendering of the service given the initial conditions set.

The stations U1, . . . , Un are usually able to simulate the effect of the application of a set of commands for updating the configuration data, creating a new version of the configuration itself whereon can be executed simulations, checks and analyses before the actual modification of the data on the nodes of the actual network.

Naturally, without changing the principle of the invention, the realization details and the embodiments can be widely varied with respect to what is described and illustrated herein, without thereby departing from the scope of the present invention.

The invention claimed is:

1. A method for controlling the configuration of elements of a telecommunications network comprising a plurality of nodes, the method comprising the steps of:
   generating a model configuration of said elements comprising, for at least one function of each element subjected to control, a respective model of implementation of the function itself,
   collecting, for each element subjected to control, at least one respective set of configuration data of the element itself,
   verifying, for each element subjected to control and in the absence of interaction with the element itself correspondence between said at least one function as implemented on the basis of said at least one respective set of configuration data of the element and said model of implementation of the function itself included in said model configuration, and
   performing the steps of generating a model configuration, collecting said at least one respective set of configuration data of the element and verifying said correspondence in relation with at least one of the group including:
      an interfacing element between two nodes of said plurality, and
      a plurality of respective sets of configuration data of said element, said plurality of respective sets of configuration data expressing respective different configuration states of the element.

2. The method as claimed in claim 1, further comprising the steps of:
   simulating on the basis of said at least one set of configuration data of the element and in the absence of interaction with the element subjected to control the implementation of said at least one function by generating at least one respective outcome of implementation of the function itself through the element subjected to control, and
   verifying correspondence between said at least one respective outcome of implementation obtained by simulation and the corresponding implementation model included in said model configuration.

3. The method as claimed in claim 2 wherein said simulating step is performed on the basis of at least one respective set of analysis functions representative of a respective element model.

4. The method as claimed in claim 2 wherein said simulating step is conducted step-by-step.

5. The method as claimed in claim 1, further comprising the step of
   selecting said plurality of respective sets of configuration data as exhaustive representation of the configuration states allowed for said element.

6. The method as claimed in claim 1, further comprising the step of
   modifying the configuration data included in said at least one respective set of configuration data of each element subjected to control in order to obtain the correspondence between the actual configuration of the element and said model configuration.

7. The method as claimed in claim 1, further comprising the step of
   selecting said model configuration as representative of at least one of the group including:
      a set of configuration data meant to be identical on all homologous elements of the network in the cases of configuration control;
      a set of expected behaviors for an element in the case of functional analysis; and
      a set of exhaustive behaviors of all elements able to be traversed in the case of simulation of a determined service throughout the network.

8. The method as claimed in claim 1, further comprising the step of
   providing a control management station for the generation of said model configuration.

9. The method as claimed in claim 1, further comprising the step of
   providing a plurality of control stations able to start the execution of said verifying step.

10. The method as claimed in claim 1 wherein at least one of said steps of generating, collecting, simulating, verifying and modifying is configured to be performed in a centralized position with respect to said elements subjected to control.

11. A system for controlling the configuration of elements of a telecommunications network comprising a plurality of nodes, the system comprising:
    a database containing a model configuration of the elements of said network and comprising
       for at least one function of each element subjected to control a respective model of implementation of the function itself,
       for each element subjected to control at least one respective set of configuration data of the element itself,
       for each element subjected to control a verification module to verify in the absence of interaction with the element itself correspondence between said at least one function, as implemented on the basis of said at least one respective set of configuration data, and said model of implementation of the function itself included in said model configuration, and
    a model configuration as well as a set of configuration data to allow the verification by said verification module in relation with an interfacing element between two nodes of said plurality or a plurality of respective sets of configuration data of said element, said plurality of respective sets of configuration data expressing respective different configuration states of the element.

12. The system as claimed in claim 11, further comprising:
    a simulation module to simulate based on said at least one respective set of configuration data of the element and in the absence of interaction with the element subjected to control, the implementation of said at least one function and generating at least a respective outcome of implementation of the function itself by the element subjected to control, said verification module being configured to verify the correspondence between said at least one respective outcome of implementation obtained by simulation and the corresponding implementation model included in said model configuration.

13. The system as claimed in claim 12 wherein said simulation module comprises a respective set of function for the simulation of respective functions.

14. The system as claimed in claim 12 wherein said simulation module operates according to step-by-step simulation modes.

15. The system as claimed in claim 11 wherein said verification module is configured to operate on a plurality of respective sets of data constituting an exhaustive representation of the allowed configuration states for said at least one element subjected to control.

16. The system as claimed in claim 11 wherein the system itself is configured to modify the data included in said at least one respective set of configuration data of each element subjected to control in order to obtain the correspondence between the actual configuration of the element and said model configuration.

17. The system as claimed in claim 11 wherein said database contains a model configuration representative of at least one of the group including:
   a set of configuration data that it is required be identical on all the homologous elements of the network in the cases of configuration controls;
   a set of expected behaviors for an element in the case of functional analyses; and
   a set of exhaustive behaviors of all elements that can be traversed in the case of simulation of a determined service throughout the network.

18. The system as claimed in claim 11, further comprising a control management station for generating said model configuration.

19. The system as claimed in claim 11, further comprising a plurality of control stations able to drive said verification module.

20. The system as claimed in claim 11 wherein said database or said verification module is located in a centralized position relative to said elements subjected to control.

21. A computer readable medium having computer-executable instructions stored thereon which, when executed by at least one digital computer, implement the method as claimed in claim 1.

* * * * *